May 19, 1931.  H. D. GEYER  1,806,343
STEERING WHEEL WITH SWIVEL SPOKE
Filed April 3, 1928

Inventor
Harvey D. Geyer
By Spencer Hardman & Fehr
his Attorney

Patented May 19, 1931

1,806,343

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL WITH SWIVEL SPOKE

Application filed April 3, 1928. Serial No. 266,936.

This invention relates to improvements in steering wheels, especially such as are adapted for use in automotive vehicles.

An object of this invention is to provide a steering wheel having a swivel hand grip therein which will enable the operator of the motor vehicle by grasping this swivel grip to rotate the wheel several complete revolutions with one hand without changing the grip of his hand upon the wheel. Such a steering wheel will be very useful on automobiles since in getting into and out of quite restricted places the steering wheel must be turned far over in opposite directions while the gears are shifted back and forth between forward to reverse. With the steering wheel of this invention one hand may be used to handle the gear shift lever while the other hand can rotate the steering wheel as many revolutions in either direction as desired without once loosening the grip of the hand thereupon.

Further objects and advantages of the present invention will be apparent from the following description, reference being had to the accompanying drawings, wherein a preferred form of embodiment of the present invention is clearly shown.

In the drawings.

Similar reference characters refer to similar parts thruout the drawings.

Figure 1:
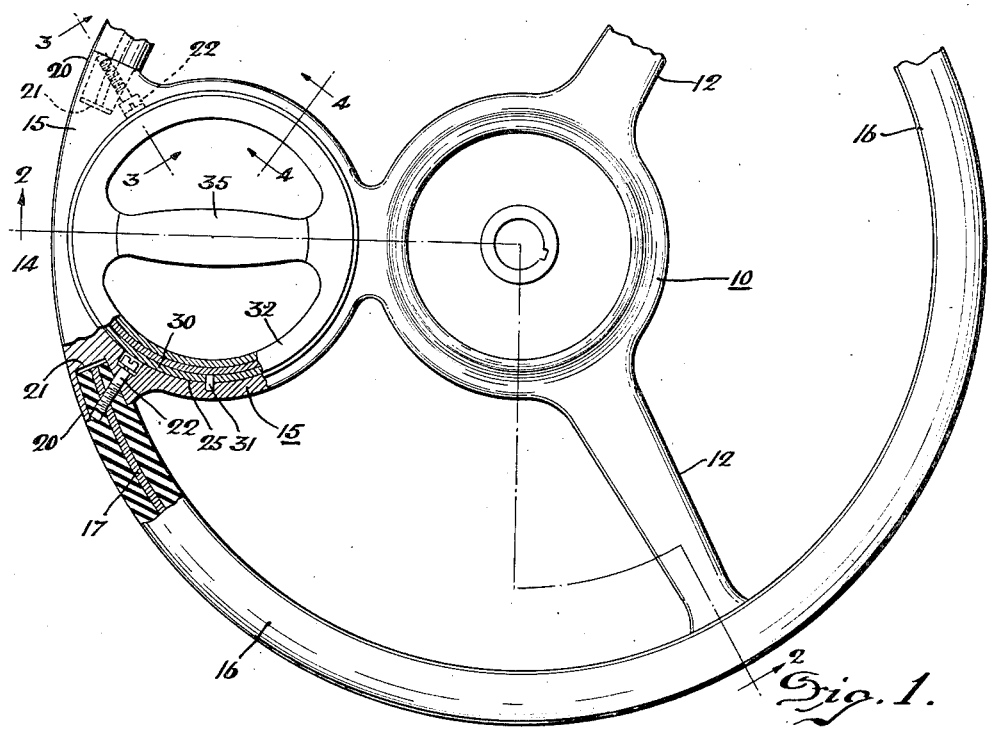
Fig. 1 is a plan view of an automobile steering wheel built according to this invention, certain parts being shown in horizontal section to illustrate the interior construction.

Numeral 10 designates the spider casting in its entirety, comprising a hub portion 118, and two spokes 12. In place of the third spoke, casting 10 has integral therewith a relatively large annular portion 15, which lies substantially in the plane of the wheel rim 16. This wheel rim 16 may be of any suitable and well-known construction, but preferably it is constructed, as illustrated, of a central steel band 17 covered with hard rubber 18 molded thereupon. The annular portion 15 extends radially out so that its outer periphery 14 lies in the rim circle and is correspondingly shaped to conform and align with the rim section. This portion 15 also has cast integral therewith projections 20 which have recesses 21 into which the free ends of the completed rim 16 are inserted and held fixed therein by the screws 22, which pass thru the steel band 17. These screws 22 are inserted from the inside of the circular bearing aperture 25 in annular portion 15, as will be clear from Fig. 1.

Figure 2:
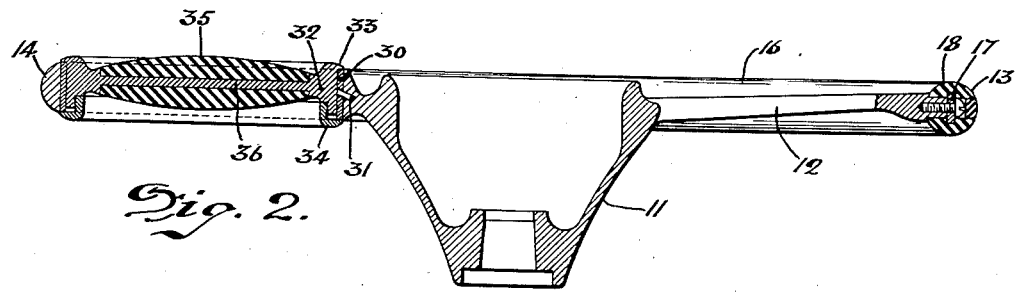
Fig. 2 is a vertical section on line 2—2 of Fig. 1.
Figure 3:
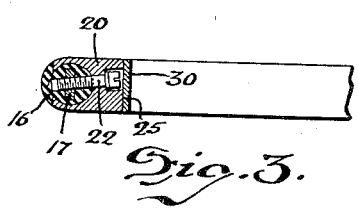
Fig. 3 is a section on line 3—3 of Fig. 1.
Figure 4:
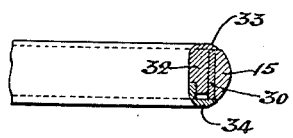
Fig. 4 is a section on line 4—4 of Fig. 1.

After the rim 16 is fixed in place to projections 20, as above described, and to the outer ends of spokes 12 by the screws 13, as shown at the right in Fig. 2, the swiveled hand grip is mounted within the circular aperture 25. A hardened steel bearing ring 30 is fixed within aperture 25 in any suitable manner as by the dowel pins 31. Rotatably mounted within the fixed ring 30 is the hand grip ring 32, which is shown as having an integral flange 33 overlapping and bearing upon the top edge of fixed ring 30, and a separate flange ring 34 threaded thereto on its lower side and overlapping and bearing upon the bottom edge of fixed ring 30. It will be clear that the rotatable ring 32 can be loosely inserted within ring 30 by first removing the threaded ring 34 therefrom and then applying threaded ring 34 from below and adjusting it to give the desired freedom of rotation of the hand grip ring 32. Extending diametrically across ring 32 and rigid therewith is the hand grip 35, which therefore, lies substantially in the plane of the rim 16 (see Fig. 2). This hand grip 35 is herein shown as having a core 36 cast integral with ring 32 and hard rubber molded thereupon to form a convenient hand grip. It will now be obvious that hand grip 35 may be grasped firmly with one hand and the entire wheel rotated any desired number of revolutions without once loosening the grip thereupon. It will be noted also that grip 35 provides a convenient place to grasp the wheel for ordinary steering of the vehicle in substantially straight road driving, since the grip 35 can be rotated to various positions without rotating the wheel and the hand thus kept from tiring from being held in the same position relatively long periods of time.

While the form of embodiment of the present invention as herein disclosed, constitutes a preferred form, it is to be understood that other forms might be adapted, all coming within the scope of the claims which follow.

What is claimed is as follows:

1. A steering wheel comprising: a cast metal spider having a hub and spokes and having integral therewith a metal rim section and having as a substitute for one spoke thereof an annular ring cast integral with the spider hub and said rim section and interconnecting same, a rim portion secured at its two ends to said metal rim section, and a hand grip rotatably mounted within said annular ring.

2. A steering wheel comprising: a cast metal spider having a relatively large central hub and having integrally cast to the periphery thereof an annular ring portion extending radially outward to the rim circle, a rim fixed to the outer edge of said annular ring, and a hand grip rotatably mounted within said annular ring.

In testimony whereof I hereto affix my signature.

HARVEY D. GEYER.